US008030509B2

(12) United States Patent
Perry et al.

(10) Patent No.: US 8,030,509 B2
(45) Date of Patent: Oct. 4, 2011

(54) CARBON DIOXIDE ABSORBENT AND METHOD OF USING THE SAME

(75) Inventors: Robert James Perry, Niskayuna, NY (US); Larry Neil Lewis, Scotia, NY (US); Michael Joseph O'Brien, Clifton Park, NY (US); Grigorii Lev Soloveichik, Latham, NY (US); Sergei Kniajanski, Clifton Park, NY (US); Tunchiao Hubert Lam, Clifton Park, NY (US); Julia Lam Lee, Niskayuna, NY (US); Malgorzata Iwona Rubinsztajn, Ballston Spa, NY (US)

(73) Assignee: General Electric Company, Niskayuna, NY (US)

( * ) Notice: Subject to any disclaimer, the term of this patent is extended or adjusted under 35 U.S.C. 154(b) by 245 days.

(21) Appl. No.: 12/512,105

(22) Filed: Jul. 30, 2009

(65) Prior Publication Data

US 2010/0158777 A1    Jun. 24, 2010

Related U.S. Application Data

(63) Continuation-in-part of application No. 12/343,905, filed on Dec. 24, 2008.

(51) Int. Cl.
*C07F 7/10* (2006.01)
*C07D 303/02* (2006.01)
*B01D 53/14* (2006.01)
*B01D 53/34* (2006.01)
*B01D 53/62* (2006.01)

(52) U.S. Cl. ........ 556/453; 556/450; 556/462; 556/465; 556/466; 556/467; 549/512; 549/513; 423/210; 423/220; 423/226; 423/228

(58) Field of Classification Search .................. 423/210, 423/220, 226, 228; 556/450, 453, 462, 465, 556/466, 467; 549/512, 513
See application file for complete search history.

(56) References Cited

U.S. PATENT DOCUMENTS

| 3,215,648 | A | 11/1965 | Duffy et al. |
| 3,660,434 | A * | 5/1972 | Patterson ...................... 549/215 |
| 6,547,854 | B1 | 4/2003 | Gray et al. |
| 7,208,605 | B2 | 4/2007 | Davis, Jr. |
| 2006/0165574 | A1 | 7/2006 | Sayari |
| 2007/0149398 | A1 | 6/2007 | Jones et al. |
| 2008/0226526 | A1 | 9/2008 | Ronning et al. |
| 2008/0282887 | A1 | 11/2008 | Chance et al. |

FOREIGN PATENT DOCUMENTS

| CS | 92652 | * | 11/1959 |
| EP | 674936 B1 | | 11/1998 |
| JP | 06-172368 | * | 6/1994 |

OTHER PUBLICATIONS

Annual Energy Outlook 2008 With Projections to 2030; Date : Jun. 2008; URL: www.eia.doe.gov/oiaf/aeo/; 224 Pages.
Se-Na Kim, Won-Jin Son, Jung-Sik Choi and Wha-Seung Ahn; Abstract : CO2 adsorption using aminefunctionalized mesoporous silica prepared via anionic surfactantmediated synthesis; Microporous and Mesoporous Materials vol. 115, Issue 3, Nov. 1, 2008.
V.V. Guliants, M.A. Carreon, Y.S. Lin; Ordered mesoporous and macroporous inorganic films and membranes; Science Direct; Journal of Membrane Science 235 (2004) 53-72.
Ravikrishna Chatti, Amit K. Bansiwal, Jayashri, A. Thote, Vivek Kumar, Pravin Jadhav, Satish, K. Lokhande, Rajesh B. Biniwale, Nitin K. Labhsetwar and Sadhana S. Rayalu; Abstract : Amine loaded zeolites for carbon dioxide capture: Amine loading and adsorption studies; Science Direct, Microporous and Mesoporous Materials, vol. 121, Issues 1-3, May 1, 2009.
PCT International Search Report dated Oct. 25, 2010 and Written Opinion.
Yang et al., "Progress in Carbon Dioxide Separation and Capture: A Review", Science Direct, Joural of Environmental Sciences, vol. 20, pp. 14-27, 2008.
"Novel High Capacity Oligomers for Low Cost CO2 Capture", Ge Global Research, GE Energy, University of Pittsburgh, Annual NETL CO2 Capture Technology for Existing Plants R&D Meeting, 32 pages, Mar. 24-26, 2009.
Kim et al., "CO2 Adsorption Using Amine-Functionalized Mesoporous Silica Prepared Via Anionic Surfactant-Mediated Synthesis", Science Direct, Microporous and Mesoporous Materials, vol. 115, pp. 497-503, 2008.

\* cited by examiner

*Primary Examiner* — Emily M Le
*Assistant Examiner* — Daniel Berns
(74) *Attorney, Agent, or Firm* — Andrew J. Caruso

(57) ABSTRACT

In accordance with one aspect, the present invention provides an amino-siloxane composition comprising at least one of structures I, II, III, IV or V said compositions being useful for the capture of carbon dioxide from gas streams such as power plant flue gases. In addition, the present invention provides methods of preparing the amino-siloxane compositions are provided. Also provided are methods for reducing the amount of carbon dioxide in a process stream employing the amino-siloxane compositions of the invention as species which react with carbon dioxide to form an adduct with carbon dioxide. The reaction of the amino-siloxane compositions provided by the present invention with carbon dioxide is reversible and thus, the method provides for multicycle use of said compositions.

11 Claims, No Drawings

CARBON DIOXIDE ABSORBENT AND METHOD OF USING THE SAME

CROSS REFERENCE TO RELATED APPLICATIONS

The present invention is a continuation in part of U.S. patent application Ser. No. 12/343,905, filed Dec. 24, 2008.

STATEMENT REGARDING FEDERALLY SPONSORED RESEARCH & DEVELOPMENT

This invention was made with Government support under grant number DE-NT0005310 awarded by the Department of Energy-NETL. The Government has certain rights in the invention.

BACKGROUND

The invention relates to an amino-siloxane compositions and their use as carbon dioxide absorbent materials.

Pulverized coal power plants currently produce over half the electricity used in the United States. In 2007, these plants emitted over 1900 million metric tons of carbon dioxide ($CO_2$), and as such, accounted for 83% of the total $CO_2$ emissions from electric power generating plants and 33% of the total US $CO_2$ emissions. Eliminating, or even reducing, these emissions will be essential in any plan to reduce greenhouse gas emissions.

Separating $CO_2$ from gas streams has been commercialized for decades in food production, natural gas sweetening, and other processes. Aqueous monoethanolamine (MEA) based solvent capture is currently considered to be the best commercially available technology to separate $CO_2$ from exhaust gases, and is the benchmark against which future developments in this area will be evaluated. Unfortunately, amine-based systems were not designed for processing the large volumes of flue gas produced by a pulverized coal power plant. Scaling the amine-based $CO_2$ capture system to the size required for such plants is estimated to result in an 83% increase in the overall cost of electricity from such a plant. Applying this technology to all existing pulverized coal power plants in the US could cost $125 billion per year, making MEA-based $CO_2$ capture an undesirable choice for large-scale commercialization.

There are many properties that desirably would be exhibited, or enhanced, in any $CO_2$ capture technology contemplated to be a feasible alternative to the currently utilized MEA-based systems. For example, any such technology would desirably exhibit a high net $CO_2$ capacity and elimination of the carrier solvent (for example water), and could provide lower capital and operating costs (less material volume required to heat and cool, therefore less energy required). A lower heat of reaction would mean that less energy would be required to release the $CO_2$ from the material. Desirably, the technology would not require a pre-capture gas compression so that a high net $CO_2$ capacity could be achieved at low $CO_2$ partial pressures, lowering the energy required for capture. Technologies utilizing materials with lower viscosities would provide improved mass transfer, reducing the size of equipment needed, as well as a reduction in the cost of energy to run it. Low volatility and high thermal, chemical and hydrolytic stability of the material(s) employed could reduce the amount of material needing to be replenished. Of course, any such technology would also desirably have low material costs so that material make-up costs for the system would be minimized. Operability of $CO_2$ release at high pressures could reduce the energy required for $CO_2$ compression prior to sequestration. Finally, such technologies would also desirably exhibit reduced corrosivity to help reduce capital and maintenance costs, and further would not require significant cooling to achieve the desired net $CO_2$ loading, reducing operating costs.

Unfortunately, many of the above delineated desired properties interact and/or depend on one another, so that they cannot be varied independently and trade-offs are required. For example, in order to have low volatility, the materials used in any such technology typically must have a relatively high molecular weight, but to have low viscosity, the materials must typically have a relatively low molecular weight. To have a high $CO_2$ capacity at low pressures, the overall heat of reaction of the absorbent material with carbon dioxide to form an adduct comprising structural units derived from the absorbent material and $CO_2$ should be relatively high, but ease of regeneration of the absorbent material and carbon dioxide from such adduct would benefit from a relatively heat of reaction.

Desirably, a $CO_2$ capture technology would be provided that optimizes as many of the above desired properties as possible, yet without causing substantial detriment to other desired properties. At a minimum, in order to be commercially viable, such technology would desirably be low cost, and utilize materials(s) having low volatility, high thermal stability and a high net capacity for $CO_2$.

BRIEF DESCRIPTION

In accordance with one aspect, the present invention provides an amino-siloxane composition comprising structure I

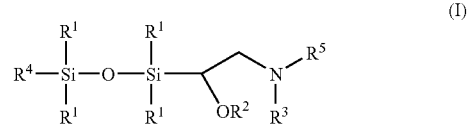

(I)

wherein $R^1$ is independently at each occurrence $C_1$-$C_5$ alkyl; $R^2$ is hydrogen or $C_1$-$C_3$ acyl; $R^3$ is a bond, hydrogen, or $C_1$-$C_5$ alkyl; $R^4$ is $C_1$-$C_5$ alkyl or $R^5$; and $R^5$ is independently at each occurrence a $C_1$-$C_{30}$ aliphatic radical comprising at least one $NH_2$ group or secondary amine group.

In another aspect, the present invention provides an amino-siloxane composition comprising structure II

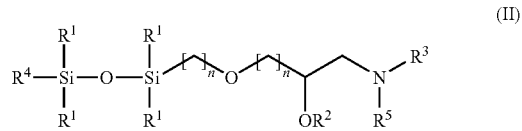

(II)

wherein $R^1$ is independently at each occurrence $C_1$-$C_5$ alkyl; $R^2$ is hydrogen or $C_1$-$C_3$ acyl; $R^3$ is a bond, hydrogen, or $C_1$-$C_5$ alkyl; $R^4$ is $C_1$-$C_5$ alkyl or $R^5$; $R^5$ is independently at each occurrence a $C_1$-$C_{30}$ aliphatic radical comprising at least one $NH_2$ group or secondary amine group; and n is independently at each occurrence 1-3.

In yet another aspect, the present invention provides an amino-siloxane composition comprising structure III

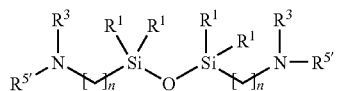
(III)

wherein $R^1$ is independently at each occurrence $C_1$-$C_5$ alkyl; $R^3$ is independently at each occurrence a bond, hydrogen, or $C_1$-$C_5$ alkyl; $R^{5'}$ is independently at each occurrence a $C_1$-$C_{30}$ aliphatic radical comprising at least one $NH_2$ group or secondary amine group and at least one other heteroatom; and n is independently at each occurrence 1-3.

In one aspect, the present invention provides an amino-siloxane composition comprising structure IV

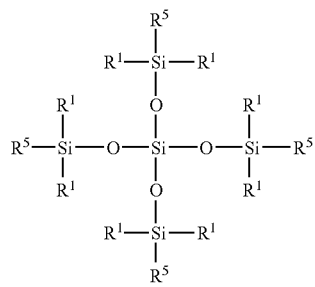
(IV)

wherein $R^1$ is independently at each occurrence $C_1$-$C_5$ alkyl; and $R^5$ is independently at each occurrence a $C_1$-$C_{30}$ aliphatic radical comprising at least one $NH_2$ group or secondary amine group.

In yet another aspect, the present invention provides an amino-siloxane composition comprising structure V

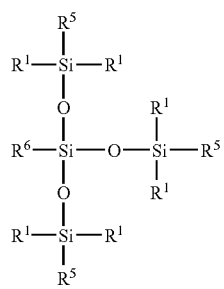
(V)

wherein $R^1$ is independently at each occurrence $C_1$-$C_5$ alkyl; $R^5$ is independently at each occurrence a $C_1$-$C_{30}$ aliphatic radical comprising at least one $NH_2$ group or secondary amine group; and $R^6$ is a $C_3$-$C_{20}$ aromatic radical.

In another aspect, the present invention provides a method of preparing an amino-siloxane composition having structure 3; said method comprising contacting a siloxysilyl oxirane having structure 1 with an organic amine having structure 2

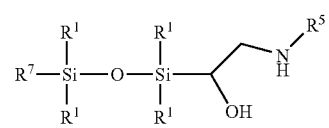
(3)

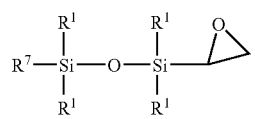
(1)

(2)

wherein $R^1$ is independently at each occurrence $C_1$-$C_5$ alkyl; and $R^5$ is independently at each occurrence a $C_1$-$C_{30}$ aliphatic radical comprising at least one $NH_2$ group or secondary amine group, and $R^7$ is a $C_1$-$C_{30}$ aliphatic radical or a $C_2$-$C_{30}$ cycloaliphatic radical.

In another aspect, the present invention provides a method reducing the amount of carbon dioxide in a process stream comprising contacting the stream with a carbon dioxide absorbent comprising at least one amino-siloxane selected from the group consisting of amino-siloxanes having structure I, amino-siloxanes having structure II, amino-siloxanes having structure III, amino-siloxanes having structure IV, and amino-siloxanes having structure V

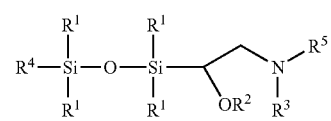
(I)

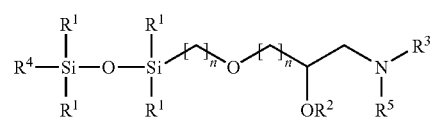
(II)

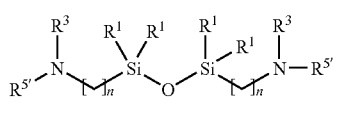
(III)

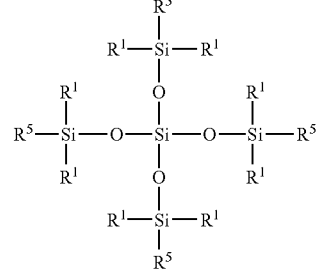
(IV)

-continued

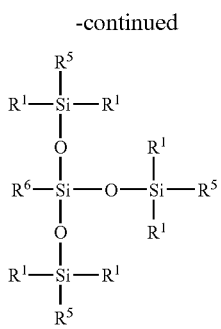

(V)

wherein $R^1$ is independently at each occurrence $C_1$-$C_5$ alkyl; $R^2$ is independently at each occurrence hydrogen or $C_1$-$C_3$ acyl; $R^3$ is independently at each occurrence a bond, hydrogen or $C_1$-$C_5$ alkyl; $R^4$ is independently at each occurrence $C_1$-$C_5$ alkyl or $R^5$; $R^5$ is independently at each occurrence a $C_1$-$C_{30}$ aliphatic radical comprising at least one $NH_2$ group or secondary amine group; $R^{5'}$ is independently at each occurrence a $C_1$-$C_{30}$ aliphatic radical comprising at least one $NH_2$ group or secondary amine group and at least one other heteroatom; and $R^6$ is a $C_3$-$C_{20}$ aromatic radical; and n is independently at each occurrence 1-3.

DETAILED DESCRIPTION

In the following specification and the claims, which follow, reference will be made to a number of terms, which shall be defined to have the following meanings. Unless defined otherwise, technical and scientific terms used herein have the same meaning as is commonly understood by one of skill in the art to which this invention belongs.

The terms "first", "second", and the like, as used herein do not denote any order, quantity, or importance, but rather are used to distinguish one element from another. Also, the terms the terms "front", "back", "bottom", and/or "top", unless otherwise noted, are merely used for convenience of description, and are not limited to any one position or spatial orientation. If ranges are disclosed, the endpoints of all ranges directed to the same component or property are inclusive and independently combinable (e.g., ranges of "up to about 25 wt. %, or, more specifically, about 5 wt. % to about 20 wt. %," is inclusive of the endpoints and all intermediate values of the ranges of "about 5 wt. % to about 25 wt. %," etc.). The modifier "about" used in connection with a quantity is inclusive of the stated value and has the meaning dictated by the context (e.g., includes the degree of error associated with measurement of the particular quantity). Similarly, "free" may be used in combination with a term, and may include an insubstantial number, or trace amounts, while still being considered free of the modified term. Here and throughout the specification and claims, range limitations may be combined and/or interchanged, such ranges are identified and include all the sub-ranges contained therein unless context or language indicates otherwise.

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein, the term "solvent" can refer to a single solvent or a mixture of solvents.

As used herein the term "aliphatic radical" refers to an organic radical having a valence of at least one consisting of a linear or branched array of atoms, which is not cyclic. Aliphatic radicals are defined to comprise at least one carbon atom. The array of atoms comprising the aliphatic radical may include heteroatoms such as nitrogen, sulfur, silicon, selenium and oxygen or may be composed exclusively of carbon and hydrogen. For convenience, the term "aliphatic radical" is defined herein to encompass, as part of the "linear or branched array of atoms which is not cyclic" a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylpent-1-yl radical is a $C_6$ aliphatic radical comprising a methyl group, the methyl group being a functional group which is an alkyl group. Similarly, the 4-nitrobut-1-yl group is a $C_4$ aliphatic radical comprising a nitro group, the nitro group being a functional group. An aliphatic radical may be a haloalkyl group which comprises one or more halogen atoms which may be the same or different. Halogen atoms include, for example; fluorine, chlorine, bromine, and iodine. Aliphatic radicals comprising one or more halogen atoms include the alkyl halides trifluoromethyl, bromodifluoromethyl, chlorodifluoromethyl, hexafluoroisopropylidene, chloromethyl, difluorovinylidene, trichloromethyl, bromodichloromethyl, bromoethyl, 2-bromotrimethylene (e.g., —$CH_2CHBrCH_2$—), and the like. Further examples of aliphatic radicals include allyl, aminocarbonyl (i.e., —$CONH_2$), carbonyl, 2,2-dicyanoisopropylidene (i.e., —$CH_2C(CN)_2CH_2$—), methyl (i.e., —$CH_3$), methylene (i.e., —$CH_2$—), ethyl, ethylene, formyl (i.e., —CHO), hexyl, hexamethylene, hydroxymethyl (i.e., —$CH_2OH$), mercaptomethyl (i.e., —$CH_2SH$), methylthio (i.e., —$SCH_3$), methylthiomethyl (i.e., —$CH_2SCH_3$), methoxy, methoxycarbonyl (i.e., $CH_3OCO$—), nitromethyl (i.e., —$CH_2NO_2$), thiocarbonyl, trimethylsilyl (i.e., $(CH_3)_3Si$—), t-butyldimethylsilyl, 3-trimethyoxysilylpropyl (i.e., $(CH_3O)_3SiCH_2CH_2CH_2$—), vinyl, vinylidene, and the like. By way of further example, a $C_1$-$C_{10}$ aliphatic radical contains at least one but no more than 10 carbon atoms. A methyl group (i.e., $CH_3$—) is an example of a $C_1$ aliphatic radical. A decyl group (i.e., $CH_3(CH_2)_9$—) is an example of a $C_{10}$ aliphatic radical.

As used herein the term "cycloaliphatic radical" refers to a radical having a valence of at least one, and comprising an array of atoms which is cyclic but which is not aromatic. As defined herein a "cycloaliphatic radical" does not contain an aromatic group. A "cycloaliphatic radical" may comprise one or more noncyclic components. For example, a cyclohexylmethyl group ($C_6H_{11}CH_2$—) is a cycloaliphatic radical, which comprises a cyclohexyl ring (the array of atoms which is cyclic but which is not aromatic) and a methylene group (the noncyclic component). The cycloaliphatic radical may include heteroatoms such as nitrogen, sulfur, selenium, silicon and oxygen, or may be composed exclusively of carbon and hydrogen. For convenience, the term "cycloaliphatic radical" is defined herein to encompass a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylcyclopent-1-yl radical is a $C_6$ cycloaliphatic radical comprising a methyl group, the methyl group being a functional group which is an alkyl group. Similarly, the 2-nitrocyclobut-1-yl radical is a $C_4$ cycloaliphatic radical comprising a nitro group, the nitro group being a functional group. A cycloaliphatic radical may comprise one or more halogen atoms, which may be the same or different. Halogen atoms include, for example; fluorine, chlorine, bromine, and iodine. Cycloaliphatic radicals comprising one or more halogen atoms include 2-trifluoromethylcyclohex-1-yl, 4-bromodifluoromethylcyclooct-1-yl, 2-chlorodifluoromethylcyclohex-1-yl, hexafluoroisopropylidene-2,2-bis(cyclohex-4-yl) (i.e., $-C_6H_{10}C(CF_3)_2C_6H_{10}-$), 2-chloromethylcyclohex-1-yl, 3-difluoromethylenecyclohex-1-yl, 4-trichloromethylcyclohex-1-yloxy, 4-bromodichloromethylcyclohex-1-ylthio, 2-bromoethylcyclopent-1-yl, 2-bromopropylcyclohex-1-yloxy (e.g., $CH_3CHBrCH_2C_6H_{10}O-$), and the like. Further examples of cycloaliphatic radicals include 4-allyloxycyclohex-1-yl, 4-aminocyclohex-1-yl (i.e., $H_2NC_6H_{10}-$), 4-aminocarbonylcyclopent-1-yl (i.e., $NH_2COC_5H_8-$), 4-acetyloxycyclohex-1-yl, 2,2-dicyanoisopropylidenebis(cyclohex-4-yloxy) (i.e., $-OC_6H_{10}C(CN)_2C_6H_{10}O-$), 3-methylcyclohex-1-yl, methylenebis(cyclohex-4-yloxy) (i.e., $-OC_6H_{10}CH_2C_6H_{10}O-$), 1-ethylcyclobut-1-yl, cyclopropylethenyl, 3-formyl-2-terahydrofuranyl, 2-hexyl-5-tetrahydrofuranyl, hexamethylene-1,6-bis(cyclohex-4-yloxy) (i.e., $-OC_6H_{10}(CH_2)_6C_6H_{10}-$), 4-hydroxymethylcyclohex-1-yl (i.e., $4-HOCH_2C_6H_{10}O-$), 4-mercaptomethylcyclohex-1-yl (i.e., $4-HSCH_2C_6H_{10}-$), 4-methylthiocyclohex-1-yl (i.e., $4-CH_3SC_6H_{10}$), 4-methoxycyclohex-1-yl, 2-methoxycarbonylcyclohex-1-yloxy($2-CH_3OCOC_6H_{10}O-$), 4-nitromethylcyclohex-1-yl (i.e., $NO_2CH_2C_6H_{10}-$), 3-trimethylsilylcyclohex-1-yl, 2-t-butyldimethylsilylcyclopent-1-yl, 4-trimethoxysilylethylcyclohex-1-yl (e.g., $(CH_3O)_3SH_2CH_2C_6H_{10}-$), 4-vinylcyclohexen-1-yl, vinylidenebis (cyclohexyl), and the like. The term "a $C_3$-$C_{10}$ cycloaliphatic radical" includes cycloaliphatic radicals containing at least three but no more than 10 carbon atoms. The cycloaliphatic radical 2-tetrahydrofuranyl($C_4H_7O-$) represents a $C_4$ cycloaliphatic radical. The cyclohexylmethyl radical ($C_6H_{11}CH_2-$) represents a $C_7$ cycloaliphatic radical.

As used herein, the term "aromatic radical" refers to an array of atoms having a valence of at least one comprising at least one aromatic group. The array of atoms having a valence of at least one comprising at least one aromatic group may include heteroatoms such as nitrogen, sulfur, selenium, silicon and oxygen, or may be composed exclusively of carbon and hydrogen. As used herein, the term "aromatic radical" includes but is not limited to phenyl, pyridyl, furanyl, thienyl, naphthyl, phenylene, and biphenyl radicals. As noted, the aromatic radical contains at least one aromatic group. The aromatic group is invariably a cyclic structure having 4n+2 "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthraceneyl groups (n=3) and the like. The aromatic radical may also include nonaromatic components. For example, a benzyl group is an aromatic radical, which comprises a phenyl ring (the aromatic group) and a methylene group (the nonaromatic component). Similarly a tetrahydronaphthyl radical is an aromatic radical comprising an aromatic group ($C_6H_3$) fused to a nonaromatic component $-(CH_2)_4-$. For convenience, the term "aromatic radical" is defined herein to encompass a wide range of functional groups such as alkyl groups, alkenyl groups, alkynyl groups, haloalkyl groups, haloaromatic groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylphenyl radical is a $C_7$ aromatic radical comprising a methyl group, the methyl group being a functional group which is an alkyl group. Similarly, the 2-nitrophenyl group is a $C_6$ aromatic radical comprising a nitro group, the nitro group being a functional group. Aromatic radicals include halogenated aromatic radicals such as 4-trifluoromethylphenyl, hexafluoroisopropylidenebis(4-phen-1-yloxy) (i.e., $-OPhC(CF_3)_2PhO-$), 4-chloromethylphen-1-yl, 3-trifluorovinyl-2-thienyl, 3-trichloromethylphen-1-yl (i.e., 3-$CCl_3$Ph-), 4-(3-bromoprop-1-yl)phen-1-yl (i.e., 4-$BrCH_2CH_2CH_2$Ph-), and the like. Further examples of aromatic radicals include 4-allyloxyphen-1-oxy, 4-aminophen-1-yl (i.e., 4-$H_2$NPh-), 3-aminocarbonylphen-1-yl (i.e., $NH_2$COPh-), 4-benzoylphen-1-yl, dicyanomethylidenebis (4-phen-1-yloxy) (i.e., $-OPhC(CN)_2PhO-$), 3-methylphen-1-yl, methylenebis(4-phen-1-yloxy) (i.e., $-OPhCH_2PhO-$), 2-ethylphen-1-yl, phenylethenyl, 3-formyl-2-thienyl, 2-hexyl-5-furanyl, hexamethylene-1,6-bis(4-phen-1-yloxy) (i.e., $-OPh(CH_2)_6PhO-$), 4-hydroxymethylphen-1-yl (i.e., 4-$HOCH_2$Ph-), 4-mercaptomethylphen-1-yl (i.e., 4-$HSCH_2$Ph-), 4-methylthiophen-1-yl (i.e., 4-$CH_3$SPh-), 3-methoxyphen-1-yl, 2-methoxycarbonylphen-1-yloxy (e.g., methyl salicyl), 2-nitromethylphen-1-yl (i.e., 2-$NO_2CH_2$Ph), 3-trimethylsilylphen-1-yl, 4-t-butyldimethylsilylphenl-1-yl, 4-vinylphen-1-yl, vinylidenebis (phenyl), and the like. The term "a $C_3$-$C_{10}$ aromatic radical" includes aromatic radicals containing at least three but no more than 10 carbon atoms. The aromatic radical 1-imidazolyl($C_3H_2N_2-$) represents a $C_3$ aromatic radical. The benzyl radical ($C_7H_7-$) represents a $C_7$ aromatic radical.

The subject matter disclosed herein relates generally to amino-siloxane carbon dioxide absorbents and methods of using the absorbents to absorb carbon dioxide from process streams, e.g., as may be produced by methods of generating electricity. Conventional carbon dioxide absorbents lack one or more of the properties considered important, if not critical, to commercial feasibility of their use in many technologies. MEA-based aqueous absorbents, for example, may be ill-suited for use with large volumes of $CO_2$-containing exhaust gases. As a result, the use of MEA-based absorbents under such circumstances may be prohibitively energy intensive and costly for implementation.

In one embodiment, the present invention provides amino-siloxanes useful as carbon dioxide absorbents which are liquids under ambient conditions and which remain liquids following exposure to carbon dioxide. For example, in one embodiment, the present invention provides a liquid amino-siloxane composition which reacts with carbon dioxide to form an adduct of the amino-siloxane with carbon dioxide, the adduct also being a liquid under ambient conditions. In certain embodiments, the physical state of the adduct of the amino-siloxane composition with $CO_2$ can be controlled by limiting the degree to which the amino-siloxane composition has been fully reacted with $CO_2$. For example, it may be possible and advantageous to limit the time and conditions of contacting the amino-siloxane composition with $CO_2$ such that the adduct contains less than the theoretical amount of $CO_2$ derived structural units (i.e. carbamate groups). Those skilled in the art will appreciate that the a primary or secondary amine with carbon dioxide is an ammonium carbamate. In one embodiment, an amino-siloxane composition which when fully reacted with $CO_2$ is a solid under ambient conditions, can be maintained in the liquid state when only partially reacted with $CO_2$. In one embodiment, the present invention provides a reaction product of an amino-siloxane composition with $CO_2$ in which less than the theoretical amount of $CO_2$ has reacted with the reactive groups of the amino-siloxane composition. In one embodiment, the degree of reaction with CO₂ is in a range from about 10 percent of theoretical to about 90 percent of theoretical. In an alternate embodiment, the degree of reaction with CO₂ is in a range from about 20 percent of theoretical to about 70 percent of theoretical. In yet another embodiment, the degree of reaction with CO₂ is in a range from about 30 percent of theoretical to about 50 percent of theoretical. The amino-siloxane composition undergoing the reaction with CO₂ to form a reaction product may be an essentially pure amino-siloxane, or may be a mixture a of an amino-siloxane with one or more other components, for example water or other diluent such as ethylene glycol dimethyl ether. Typically, the amino-siloxane compositions are capable of absorbing an amount of CO₂ corresponding to from about 1 to about 50 percent by weight of the composition. The amino-siloxane compositions provided by the present invention and/or used according to the methods provided by the present invention, are considered to be nonoligomeric and non-polymeric in that the materials do not contain "adjacent repeat units" derived from monomeric species. As used herein, an adjacent repeat unit derived from a monomeric species is a structural unit derived from a monomer and present in a molecule chemically bound to an identical structural unit in the same molecule without an intervening structure disposed between the two. Oligomeric materials are defined herein as molecules having between two and twenty adjacent repeat units, and polymeric materials are defined herein as molecules having more than twenty adjacent repeat units. Notwithstanding the relatively low molecular weight of the amino-siloxane compositions provided by the present invention when compared to analogous oligomeric and polymeric materials, the amino-siloxane compositions provided by the present invention typically exhibit a low vapor pressure comprise functional groups (e.g. NH₂ groups, secondary amine groups) that either react reversibly with, or have a high affinity for, CO₂. Amino-siloxane compositions provided by the present invention may exhibit properties considered key to their use in processes involving the reversible capture of carbon dioxide. Thus, amino-siloxane compositions provided by the present invention in various embodiments remain in a liquid state over a range of temperatures, are relatively non-volatile when compared to MEA, are thermally stable, and do not require a carrier fluid. Further, the amino-siloxane compositions provided by the present invention may exhibit a high capacity for CO₂ absorption. For example, amino-siloxane compositions may be prepared which contain a relatively high concentration of CO₂-reactive functional groups and functional groups which may act to favor the formation of adducts with CO₂, for example quaternary ammonium groups. The amino-siloxane compositions provided by the present invention, owing to the presence of siloxane groups, are in various embodiments relatively hyrdrophobic compared to MEA-based absorbents and may be employed under nonaqueous conditions.

As noted, the amino-siloxane compositions provided by the present invention are relatively non-volatile liquids at room temperature, and may be stable at high temperatures, e.g., up to about 150° C., and typically may not require the use of additional solvents in order to achieve an acceptable viscosity level. As is amply disclosed in the Examples section of the present disclosure, the amino-siloxane compositions comprising functional groups which are reversibly reactive with carbon dioxide may be prepared efficiently and with a high level of structural diversity.

The amino-siloxane compositions provided by the present invention may desirably be functionalized with groups that enhance the net capacity of the compositions for CO₂ absorption. Functional groups that are expected to be CO₂-philic, and thus enhance the affinity of the amino-siloxane composition for CO₂ include acetate groups, carbonate groups, ketone groups, quaternary ammonium groups, imine groups, guanidine groups, and amidine groups. Examples of amine functional groups that exhibit CO₂-reactivity include primary amine groups and secondary amine groups. Numerous methods for the introduction of such functional groups are known those of ordinary skill in the art using techniques such as hydrosilylation and displacement. Michael A. Brook's book, *Silicon in Organic, Organometallic, and Polymer Chemistry* (Wiley VCH Press, 2000), provides useful guidance in this area and is incorporated herein by reference in its entirety for purposes related to synthetic methods. In one embodiment, the present invention provides amino-siloxane compositions comprising one or more guanidine groups or amidine groups. A primary amine group (NH₂) may be transformed into to a guanidine group under mild conditions by reaction with the Vilsmeier salt of, for example, tetraisopropyl thiourea or diisopropyl carbodiimide, to provide a guanidine group. Similarly, amidine groups may be prepared by, for example, reaction of a primary or secondary amine group with ethyl acetimidate (the Pinner reaction product of acetonitrile with ethanol).

As noted, in one embodiment, the present invention provides an amino-siloxane composition comprising structure I

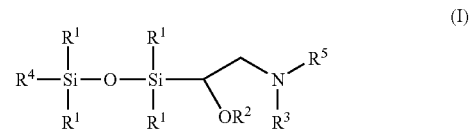

wherein $R^1$ is independently at each occurrence $C_1$-$C_5$ alkyl; $R^2$ is hydrogen or $C_1$-$C_3$ acyl; $R^3$ is a bond, hydrogen or $C_1$-$C_5$ alkyl; $R^4$ is $C_1$-$C_5$ alkyl or $R^5$; and $R^5$ is independently at each occurrence a $C_1$-$C_{30}$ aliphatic radical comprising at least one NH₂ group or secondary amine group. Amino-siloxane compositions having structure I are illustrated in Table 1 below.

TABLE 1

Examples Of Amino-Siloxane Compositions Having Structure I

| Entry | Structure | $R^1$ | $R^2$ | $R^3$ | $R^4$ | $R^5$ |
|---|---|---|---|---|---|---|
| Ia | H₂N—CH₂CH₂—NH—CH₂CH(OH)—Si(Me)₂—O—Si(Me)₂—CH₂CH(OH)—NH—CH₂CH₂NH₂ | Me | H | H | H₂N—CH₂CH₂—NH—CH₂CH(OH)— | CH₂CH₂NH₂ |

TABLE 1-continued

Examples Of Amino-Siloxane Compositions Having Structure I

| Entry | Structure | R¹ | R² | R³ | R⁴ | R⁵ |
|---|---|---|---|---|---|---|
| Ib | (structure) | Me | H | H | Me | $CH_2CH_2NH_2$ |
| Ic | (structure) | Me | H | H | Me | $(CH_2)_3NH_2$ |
| Id | (structure) | Me | H | H | (structure) | $(CH_2)_3NH_2$ |
| Ie | (structure) | Me | H | H | Me | (structure) |
| If | (structure) | Me | bond | H | Me | (structure) |

In one embodiment, the amino-siloxane has structure Ia.

(Ia)

In another embodiment, the amino-siloxane has structure Ib.

(Ib)

In one embodiment, the present invention provides an amino-siloxane composition comprising structure II

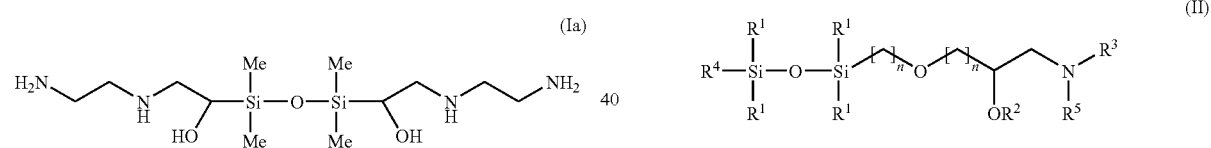

(II)

wherein $R^1$ is independently at each occurrence $C_1$-$C_5$ alkyl; $R^2$ is hydrogen or $C_1$-$C_3$ acyl; $R^3$ is a bond, hydrogen, or $C_1$-$C_5$ alkyl; $R^4$ is $C_1$-$C_5$ alkyl or $R^5$; $R^5$ is independently at each occurrence a $C_1$-$C_{30}$ aliphatic radical comprising at least one $NH_2$ group or secondary amine group; and n is independently at each occurrence 1-3.

In one embodiment, the amino-siloxane composition has structure IIa.

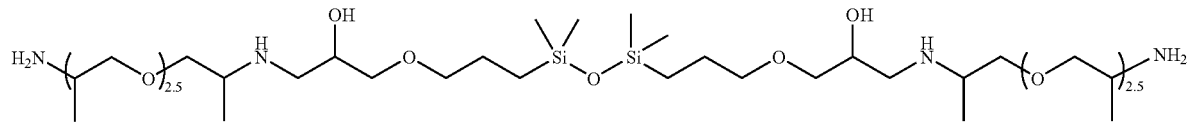

(IIa)

In another embodiment, the amino-siloxane composition has structure IIb.

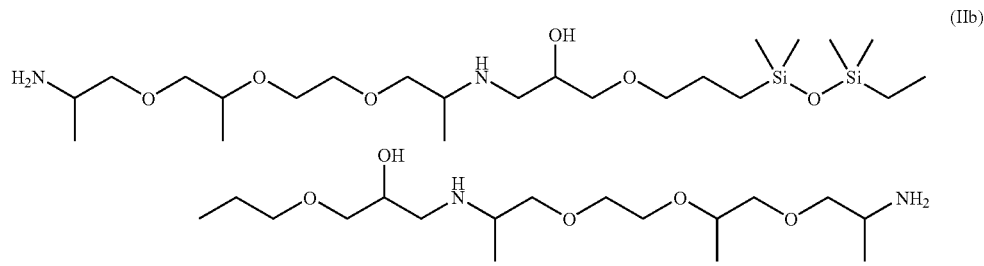

In one embodiment, the present invention provides an amino-siloxane composition comprising structure III

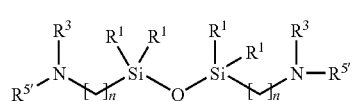

(III)

wherein $R^1$ is independently at each occurrence $C_1$-$C_5$ alkyl; $R^3$ is independently at each occurrence a bond, hydrogen, or $C_1$-$C_5$ alkyl; $R^{5'}$ is independently at each occurrence a $C_1$-$C_{30}$ aliphatic radical comprising at least one $NH_2$ group or secondary amine group and at least one other heteroatom; and n is independently at each occurrence 1-3. Amino-siloxane compositions having structure III are illustrated in Table 2 below.

TABLE 2

Examples Of Amino-siloxane compositions Having Structure III

| Entry | Structure | R¹ | R³ | R⁵' | n |
|---|---|---|---|---|---|
| IIIa | [structure] | Me | H | [−O−(CH₂)₂.₅−O−CH₂−CH(NH₂)−CH₃] | 1 |
| IIIb | [structure] | Me | H | [−NH−CH₂−CH₂−NH₂] | 3 |
| IIIc | [structure] | Me | H | [−O−CH₂−CH(CH₃)−O−CH₂−CH(NH₂)−CH₃] | 1 |
| IIId | [structure] | Me | H | [−(O−)₂.₅−O−CH₂−CH(NH₂)−CH₃] | 3 |
| IIIe | [structure] | Me | H | [−O−CH₂−CH(CH₃)−O−CH₂−CH(NH₂)−CH₃] | 3 |
| IIIf | [structure] | Me | H | [−N=C(Me)−NH₂] | 3 |
| IIIg | [structure] | Me | H | [−NH−CH₂CH₂−NH−CH₂CH₂−NH₂] | 3 |

In one embodiment, the amino-siloxane has a structure IIIa.

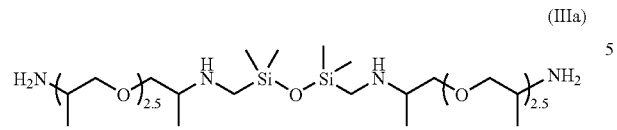
(IIIa)

In another embodiment, the amino-siloxane has a structure IIIb.

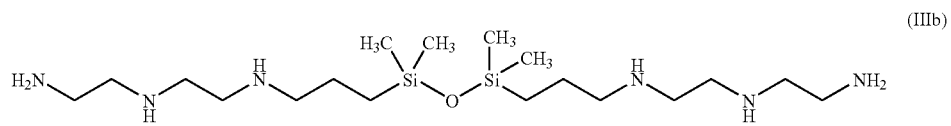
(IIIb)

In one embodiment, the present invention provides an amino-siloxane composition comprising structure IV

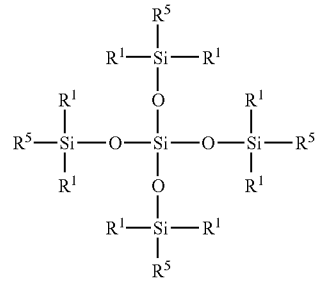
(IV)

wherein $R^1$ is independently at each occurrence $C_1$-$C_5$ alkyl; and $R^5$ is independently at each occurrence $C_1$-$C_{30}$ aliphatic radical comprising at least one $NH_2$ group or secondary amine group.

In one embodiment, the amino-siloxane has structure IVa.

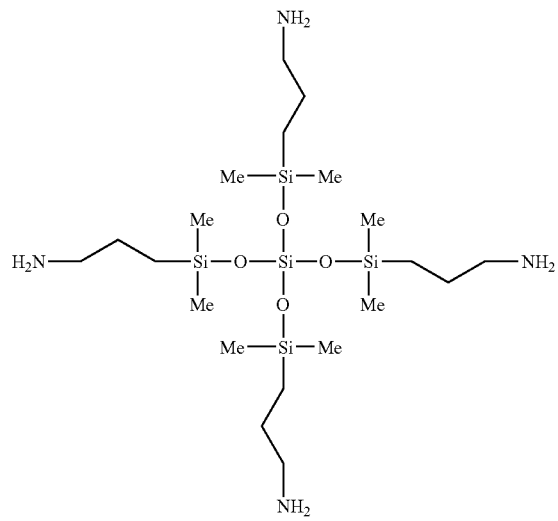
(IVa)

In one embodiment, the amino-siloxane composition has structure IVb.

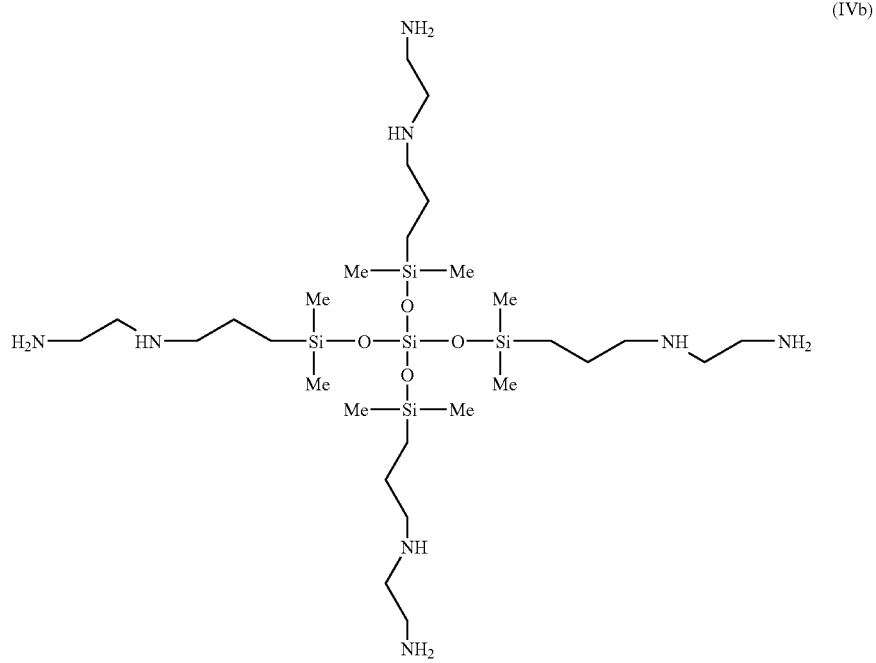

(IVb)

In one embodiment, the present invention provides an amino-siloxane composition comprising structure V

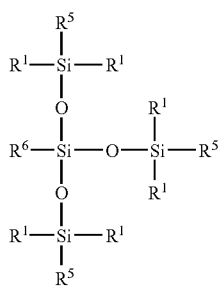

(V)

wherein $R^1$ is independently at each occurrence $C_1$-$C_5$ alkyl; $R^5$ is independently at each occurrence a $C_1$-$C_{30}$ aliphatic radical comprising at least one $NH_2$ group or secondary amine group; and $R^6$ is a $C_3$-$C_{20}$ aromatic radical.

In one embodiment, the amino-siloxane composition has structure Va.

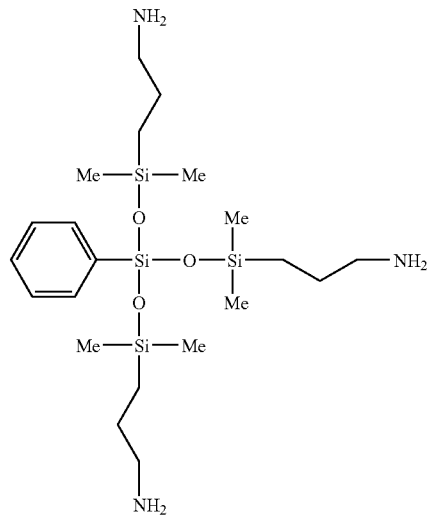

(Va)

In one embodiment, the amino-siloxane composition having structure I reacts with carbon dioxide to form a reaction product referred to as an adduct. In another embodiment, the amino-siloxane composition having structure II reacts with carbon dioxide to form a reaction product referred to as an adduct. In yet another embodiment, the amino-siloxane composition having structure III reacts with carbon dioxide to form a reaction product referred to as an adduct. In yet still another embodiment, the amino-siloxane composition having structure IV reacts with carbon dioxide to form a reaction product referred to as an adduct. In yet still another embodiment, the amino-siloxane composition having structure V reacts with carbon dioxide to form a reaction product referred to as an adduct.

In another aspect of the present invention a method of preparing an amino-siloxane composition having structure 3 is provided.

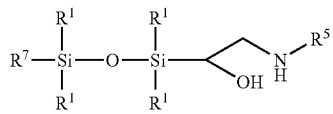
(3)

wherein $R^1$ is independently at each occurrence $C_1$-$C_5$ alkyl; and $R^5$ is a $C_1$-$C_{30}$ aliphatic radical comprising at least one $NH_2$ group or secondary amine group, and $R^7$ is a $C_1$-$C_{30}$ aliphatic radical or a $C_2$-$C_{30}$ cycloaliphatic radical.

The method includes contacting a siloxysilyl oxirane having structure 1 with an organic amine having structure 2

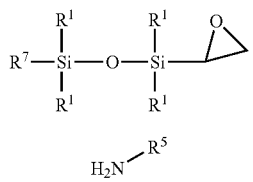
(1)

(2)

wherein $R^1$ is independently at each occurrence $C_1$-$C_5$ alkyl; and $R^5$ is $C_1$-$C_{30}$ aliphatic radical comprising at least one $NH_2$ group or secondary amine group, and $R^7$ is a $C_1$-$C_{30}$ aliphatic radical or a $C_2$-$C_{30}$ cycloaliphatic radical. In one embodiment, the siloxysilyl oxirane compound has a structure 1a.

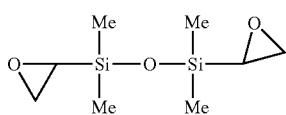
(1a)

Optionally, the amino-siloxane composition provided by the present invention may also include other components, such as, e.g., oxidation inhibitors to increase the oxidative stability and anti-foaming agents. The use of oxidation inhibitors, also called antioxidants, can be especially advantageous in those embodiments of the invention wherein the amine groups are sensitive to oxidation.

In one embodiment, the present invention provides a method reducing the amount of carbon dioxide in a process stream comprising contacting the stream with a carbon dioxide absorbent composition comprising at least one amino-siloxane selected from the group consisting of amino-siloxanes having structure I, amino-siloxanes having structure II, amino-siloxanes having structure III, and amino-siloxanes having structure IV, and amino-siloxanes having structure V

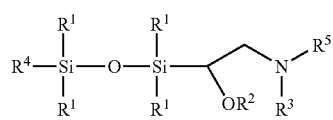
(I)

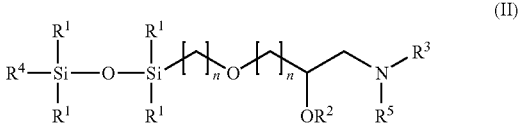
(II)

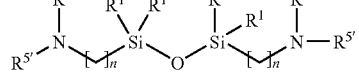
(III)

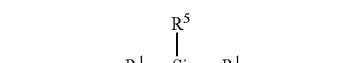
(IV)

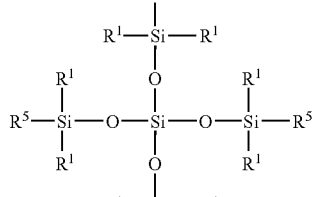
(V)

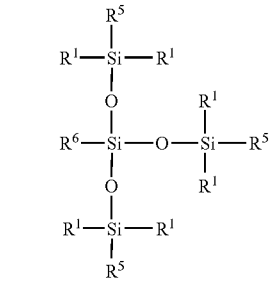

wherein $R^1$ is independently at each occurrence $C_1$-$C_5$ alkyl; $R^2$ is hydrogen or $C_1$-$C_3$ acyl; $R^3$ is independently at each occurrence a bond, hydrogen or $C_1$-$C_5$ alkyl; $R^4$ is $C_1$-$C_5$ alkyl or $R^5$; $R^5$ is independently at each occurrence a $C_1$-$C_{30}$ aliphatic radical comprising at least one $NH_2$ group or secondary amine group; $R^{5'}$ is independently at each occurrence a $C_1$-$C_{30}$ aliphatic radical comprising at least one $NH_2$ group or secondary amine group and at least one other heteroatom; $R^6$ is a $C_3$-$C_{20}$ aromatic radical; and n is independently at each occurrence 1-3. In one embodiment, the amino-siloxane composition is a liquid. In one embodiment, the process stream is a by-product from coal combustion.

In one embodiment, the present invention provides a reaction product of an amino-siloxane composition having structure VI with carbon dioxide. The experimental section of this disclosure provides detailed guidance on the preparation

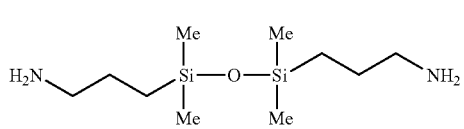
(VI)

of such reaction products, also referred to at times herein as adducts of the amino-siloxane composition with carbon dioxide.

In another embodiment, the present invention provides a method of reducing the amount of carbon dioxide in a process stream comprising contacting the stream with a carbon dioxide absorbent comprising at least one amino-siloxane having structure VI.

The carbon dioxide absorbents provided herein are expected to provide advantages when utilized to remove CO$_2$ from process gases, as compared to those currently commercially available and/or utilized for this purpose. As such, a method of reducing the carbon dioxide in a process stream is provided and comprises contacting the process stream with the carbon dioxide absorbents described herein. The process stream so treated may be any wherein the level of CO$_2$ therein is desirably reduced, and in many processes, CO$_2$ is desirably reduced at least in the exhaust streams produced thereby. The process stream is typically gaseous but may contain solid or liquid particulates, and may be at a wide range of temperatures and pressures depending on the application.

The carbon dioxide absorbents, and methods of using them, provided herein may benefit from economies of scale which lower their cost. Further, the absorbents have relatively low volatility, high thermal stability and can be provided using the synthetic methods disclosed herein. It is believed that the compositions provided by the present invention will be especially useful in power plants requiring means for reducing carbon dioxide emissions. Thus, in one embodiment, the present invention provides a method for reducing carbon dioxide emissions utilizing the compositions provided by the present invention.

EXAMPLES

The following examples illustrate methods and embodiments in accordance with the invention. Unless specified otherwise, all ingredients may be commercially available from such common chemical suppliers as Alpha Aesar, Inc. (Ward Hill, Mass.), Sigma Aldrich (St. Louis, Mo.), Spectrum Chemical Mfg. Corp. (Gardena, Calif.), and the like.

Carbon dioxide uptake measurements were carried out using lab scale and high throughput screening techniques.

Representative Lab-Scale Example:

To a tared, 25 mL, 3-neck, round bottom flask equipped with a mechanical stirrer, gas inlet tube and a gas bubbler was placed a pre-determined weight of solvent (typically approximately 2 grams). The solvent was stirred and heated in an oil bath at 40° C. while a constant flow of dry CO$_2$ was passed into the flask. After 2 hours of exposure to CO$_2$, the gas was turned off, the reaction flask was weighed and the weight recorded. The difference in weight was the amount of CO$_2$ that had been adsorbed which could be expressed as a % weight gain from the original weight of the solvent.

High Throughput Screening

High throughput CO$_2$ uptake measurements were carried out with a 27 well parallel reactor (ReactiVap III) from Pierce (Rockford, Ill., USA) and a Symyx Core Module for automated weighing in 8 mL glass vials. The experiments were run using technical grade CO$_2$ at 1 atm and the flow was set at 1.2 mL/h (10000 cm$^2$/min) by using a MKS gas flow controller. Each formulation was tested in triplicate. Co-solvents were purchased from Aldrich or Fisher Scientific and used without further purification.

Vials were equipped with a stir bar and preweighed using the Symyx Core module. The vials were then loaded with the amino-siloxane compound (200-300 μL). The contents were treated with CO$_2$ gas (1 atm) for 60-120 min at the desired temperature (40 and 55° C.). After the CO$_2$ treatment, the reactor block was cooled to room temperature and all the vials were transferred to a Symyx Core Module® for automated weighing. The physical state of each vial was visually inspected and recorded. The CO$_2$ adsorption performance was reported as an average of the % weight gain after each CO$_2$ treatment.

Example 1

Preparation of amino-siloxane Composition (Ia)

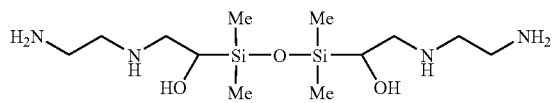

Silyloxysilyl oxirane 1a (also referred to herein as silyloxysilyl bisoxirane 1a), prepared as in example 13 below (10.15 g, 46.6 mmol) is dissolved in 100 mL of anhydrous tetrahydrofuran and transferred to an addition funnel. Ethylenediamine (16.7 g) is dissolved in 100 mL anhydrous tetrahydrofuran and charged to a 500 mL flask equipped with the addition funnel, a condenser and a magnetic stir bar. The solution of silyloxysilyl oxirane 1a is added to the ethylenediamine over a period of about 1 h and the resultant mixture is heated to about 70° C. overnight. The reaction mixture is cooled to room temperature and concentrated under reduced pressure on a rotary evaporator to provide amino-siloxane composition Ia.

Example 2

Preparation of amino-siloxane Composition (Ib)

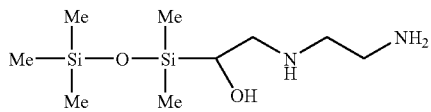

A 3-neck, 250 mL flask is charged with ethylenediamine (about 15 g) in 100 mL isopropanol and 5 mL of water. Silyloxysilyl oxirane (Preparative Method B below) (about log) in 100 mL of isopropanol is charged to an addition funnel and slowly added to the ethylenediamine solution with heating to a temperature of about 70° C. for a period of 24 hours. The reaction mixture is cooled and then concentrated under reduced pressure to afford amino-siloxane Ib.)

Example 3

Reaction of Jeffamine D-230 with bis(glycidoxy-propyl)tetramethyldisiloxane to Provide amino-siloxane (IIa)

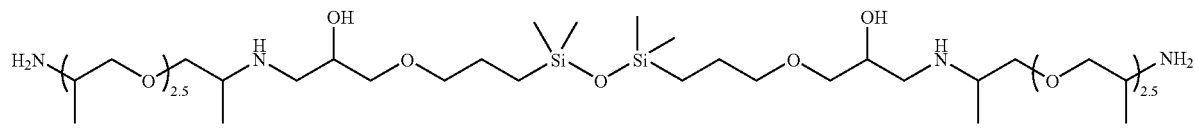

To 10.0 g of Jeffamine D-230 was added 4.0 g of bis(glycidoxypropyl)tetramethyldisiloxane with stirring under a nitrogen atmosphere. The mixture was then heated to about 90° C. for 4 hours. The reaction mixture was cooled to room temperature, and diluted with chloroform and transferred to a separatory funnel and washed with deionized water (5×) to remove remaining unreacted Jeffamine D-230 that may be present. The chloroform solution was then washed with saturated sodium chloride solution and then dried over anhydrous potassium carbonate. The drying agent was removed by filtration and the filtrate was concentrated under reduced pressure on a rotary evaporator to yield about 8.15 g of the reaction product (IIa) (90% yield) as a yellow oil. $^1$H NMR (CDCl$_3$) δ 0.01 (s, CH$_3$Si), 0.47 (m, CH$_2$Si), 0.98 (m, CH$_3$), 1.10 (m, CH$_3$), 1.3-1.8 (broad m, NHs), 1.55 (m, CH$_2$CH$_2$CH$_2$), 2.4-2.9 (br multiplets, CH$_2$Ns), 3.0-3.9 (br. multiplets, CHxOs). Carbon dioxide uptake was determined at 40° C. as disclosed herein and found to be 3.7%.

Example 4

Reaction of Jeffamine HK-511 with bis(glycidoxy-propyl)tetramethyldisiloxane adduct to provide amino-siloxane (IIb)

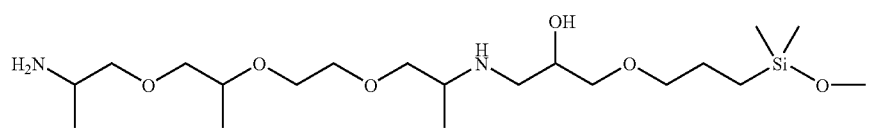

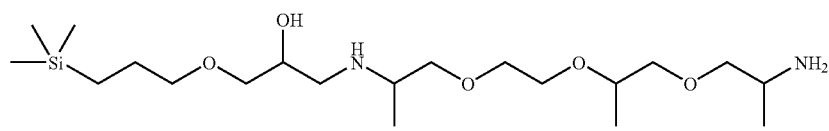

About 8.4 g of Jeffamine HK-511 was reacted with about 6.0 g of bis(glycidoxypropyl)tetramethyldisiloxane as in Example 1 at about 90° C. for a period 2 hours. The reaction mixture was worked up as in Example 3 to provide product IIb (11.3 g, 85% yield) as a yellow oil. $^1$H NMR (CDCl$_3$) δ−0.01 (s, CH$_3$Si), 0.43 (m, CH$_2$Si), 0.96 (m, CH$_3$), 1.07 (m, CH$_3$), 1.3-2.0 (broad m, NHs), 1.55 (m, CH$_2$CH$_2$CH$_2$), 2.4-2.9 (br multiplets, CH$_2$Ns), 3.0-3.9 (br. multiplets, CH$_x$Os). Carbon dioxide uptake was determined at 40° C. as disclosed herein and found to be 4.4%.

Example 5

Reaction of Jeffamine D-230 with bis(chloromethyl)tetramethyldisiloxane to provide amino-siloxane (IIIa)

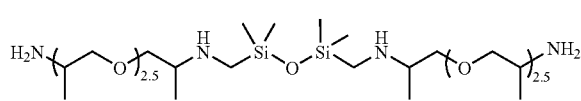

About 12.0 g of Jeffamine D-230 was heated to approximately 90° C. under nitrogen. About 3.0 g of bis(chloromethyl)tetramethyldisiloxane was then added drop-wise to the Jeffamine D-230 and the reaction mixture was heated at 90° C. for about 5 hours. The reaction mixture was then cooled to room temperature and diluted with chloroform. The resulting solution was washed once with 5% sodium hydroxide, followed by washing several times with water, then once with NaCl solution, and then dried over anhydrous potassium carbonate. The drying agent was removed by filtration and the filtrate was concentrated under reduced pressure on a rotary evaporator to yield about 5.91 g (73% yield) of the amino-siloxane product (IIIa) as a low viscosity yellow oil. $^1$H NMR (CDCl$_3$) δ−0.08 (s, CH$_3$Si), 0.9-1.1 (multiplets, CH$_3$s), 1.40 (m, NHs), 1.78 (m, NCH$_2$Si), 2.66 (CHN), 3.0-3.8 (m, CH$_x$Os). Carbon dioxide uptake was determined at 40° C. as disclosed herein and found to be 10.4%.

Example 6

Reaction of diethylenetriamine with bis(chloropropyl)tetramethyldisiloxane to Provide amino-siloxane (IIIb)

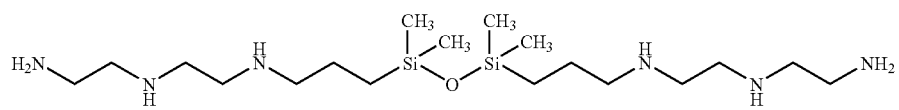

28.7 g of diethylenetriamine was heated to about 110° C. under nitrogen, and 10.0 g of bis(chloropropyl) tetramethyldisiloxane was added drop-wise over about 20 minutes under stirring. The reaction mixture was held at about 110° C. overnight. The reaction mixture was then cooled to room temperature, dissolved in chloroform and extracted with 5% NaOH (one time), deionized water (3 times) and saturated NaCl (one time) and then dried over anhydrous potassium carbonate. The drying agent was removed by filtration and the filtrate was concentrated under reduced pressure on a rotary evaporator to yield about 7.3 g (50% yield) of the product IIIb as a low viscosity yellow oil. $^1$H NMR (CDCl$_3$) δ–0.02 (s, CH$_3$Si), 0.44 (m, CH$_2$Si), 1.29 (br s, NHs), 1.43 (m, CH$_2$CH$_2$CH$_2$), 2.53 (t, J=6H, CH$_2$NH), 2.62 (t, J=6H, CH$_2$NH), 2.67 (m, CH$_2$NH$_2$), 2.74 (t, J=6H, CH$_2$NH$_2$). There were also two smaller peaks at 2.38 (m) and 2.43 (t) that probably correspond to minor products. Carbon dioxide uptake was determined at 40° C. as disclosed herein and found to be 2.0%.

Example 7

Reaction of Jeffamine D-230 with bis(chloropropyl)tetramethyldisiloxane to Provide amino-siloxane (IIId)

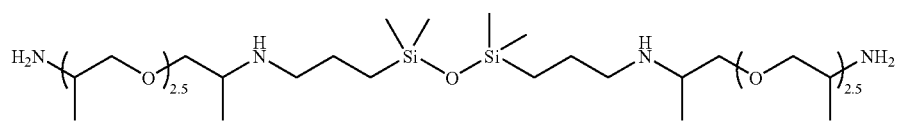

4.0 g of bis(chloropropyl)tetramethyldisiloxane was added to about 12.8 g of Jeffamine D-230 and heated to between about 105° C. and about 110° C. under nitrogen for about 7 hours. The amino-siloxane product IIId was isolated as described in Example 6 to yield about 8.77 g (93% yield) of the product compound IIId as an orange oil. $^1$H NMR (CDCl$_3$) δ–0.03 (s, CH$_3$Si), 0.43 (t, J=8 Hz, CH$_2$Si), 0.94 (m, CH$_3$), 1.08 (m, CH$_3$), 1.2-1.5 (broad ms, NHs and CH$_2$CH$_2$CH$_2$), 2.3-2.9 (br multiplets, CH$_2$Ns), 2.95-3.6 (br. multiplets, CH$_x$Os). Carbon dioxide uptake was determined at 40° C. as disclosed herein and found to be 8.4%.

Example 8

Reaction of Jeffamine HK-511 with bis(chloropropyl)tetramethyldisiloxane to provide amino-siloxane (IIIe)

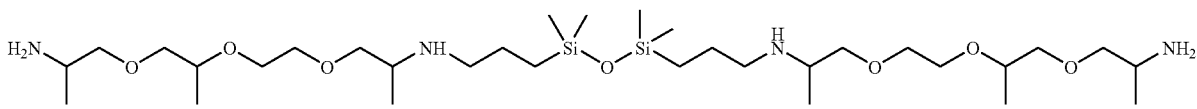

3.0 g of bis(chloropropyl)tetramethyldisiloxane was added drop-wise to about 11.5 g of Jeffamine HK-511 and the mixture was heated to between about 105° C. and 110° C. under nitrogen for about 3 hours. After cooling the reaction mixture was subjected to aqueous workup (5% NaOH, water, brine) and dried over anhydrous potassium carbonate. The drying agent was removed by filtration and the filtrate was concentrated under reduced pressure on a rotary evaporator to yield about 6.44 g (94% yield) of the amino-siloxane product IIIe as a low viscosity yellow oil. $^1$H NMR (CDCl$_3$) δ 0.02 (s, CH$_3$Si), 0.48 (t, J=8 Hz, CH$_2$Si), 0.99 (m, CH$_3$), 1.12 (m, CH$_3$), 1.2-1.6 (broad ms, NHs and CH$_2$CH$_2$CH$_2$), 2.4-2.9 (br multiplets, CH$_2$Ns), 3.0-3.7 (br. multiplets, CH$_x$Os). Carbon dioxide uptake was determined at 40° C. as disclosed herein and found to be 7.7%.

Example 9

Reaction of triethylenetetramine with bis(chloropropyl)tetramethyldisiloxane to Provide amino-siloxane Composition (IIIg)

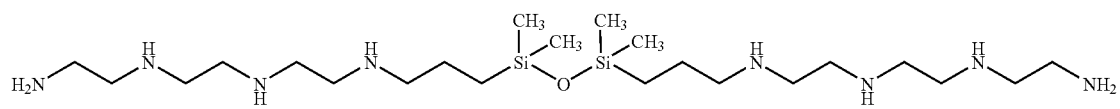

About 36.6 g of triethylenetetramine was heated to about 110° C. under nitrogen and 9.0 g of bis(chloropropyl)tetramethyldisiloxane was added drop-wise over a period of 30 minutes under stirring. The reaction mixture was maintained at 110° C. for about 5 hours. The reaction mixture was cooled to ambient temperature and the product was isolated as in Example 8 to yield about 5.73 g (36% yield) of the product IIIg as a light yellow oil. $^1$H NMR (CDCl$_3$) δ−0.09 (s, CH$_3$Si), 0.36 (m, CH$_2$Si), 1.27 (br s, NHs), 1.35 (m, CH$_2$CH$_2$CH$_2$), 2.1-2.8 (series of multiplets, CH$_2$N). Carbon dioxide uptake was determined at 40° C. as disclosed herein and found to be 6.3%.

Example 10

Reaction of Jeffamine HK-511 with bis(chloromethyl)tetramethyldisiloxane to Provide amino-siloxane (IIIh)

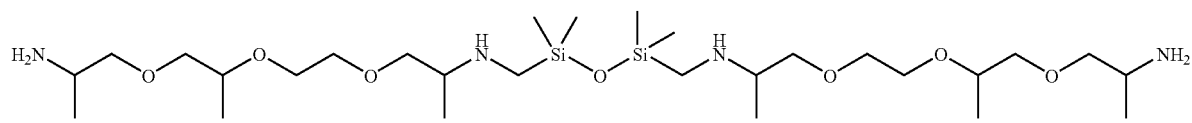

Bis(chloromethyl)tetramethyldisiloxane (3.0 grams) was added drop-wise to 14.3 g of Jeffamine HK-511 at 75° C. under a nitrogen atmosphere. The temperature of the reaction mixture was raised to from 80° C. to 85° C. and held at that temperature for three hours. The reaction mixture was then cooled and the product was isolated as described above to yield 4.98 g (64% yield) amino-siloxane (IIIh) as a light yellow oil. 1H NMR (CDCl3) δ−0.06 (s, CH3Si), 0.85-1.2 (multiplets, CH3s), 1.39 (m, NHs), 1.76 (m, NCH2Si), 2.6-2.6 (CHN), 3.0-3.7 (m, CHxOs). Carbon dioxide uptake was determined at 40° C. as disclosed herein and found to be 8.8%.

Example 11

Preparation of tetrakis(3-aminopropyldimethylsiloxy)silane (IVa)

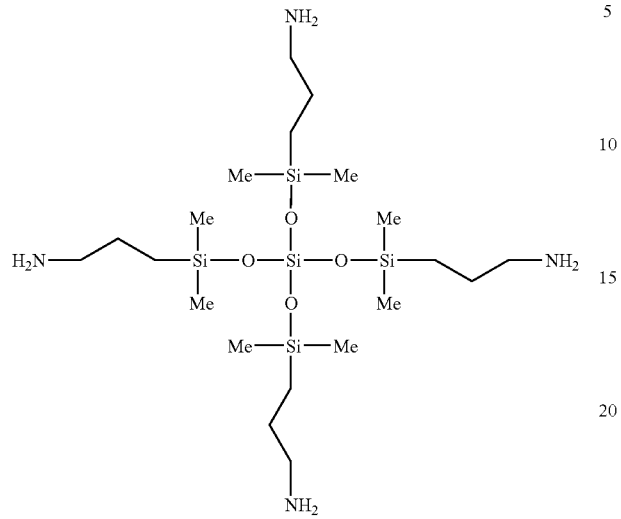

Allylamine (7.95 g, 132 mmol) was added to a solution of about 10.0 g (30.5 mmol) of Si(OSiMe$_2$H)$_4$ in a mixture of 40 ml dry toluene and 0.5 ml of Karsted's catalyst (5% in xylenes). The reaction mixture was heated at reflux for about 2 h. The reaction mixture was concentrated under reduced pressure on a rotary evaporator to give yield about 16.5 g the product compound IVa as a dark, viscous liquid. $^1$H NMR (CD$_2$Cl$_2$, ppm δ: 2.64 tr (8H, CH$_2$NH$_2$, JH-H=7.07 Hz); 1.47 m (8H, CH$_2$CH$_2$CH$_2$); 0.98 brs (8H, NH$_2$); 0.58 m (8H, CH$_2$Si); 0.13 s (24H, SiMe$_2$). Carbon dioxide uptake was determined at 40° C. as disclosed herein and found to be 5.8%.

Example 12

Preparation of tris(3-aminopropyldimethylsiloxy)phenylsilane (Va)

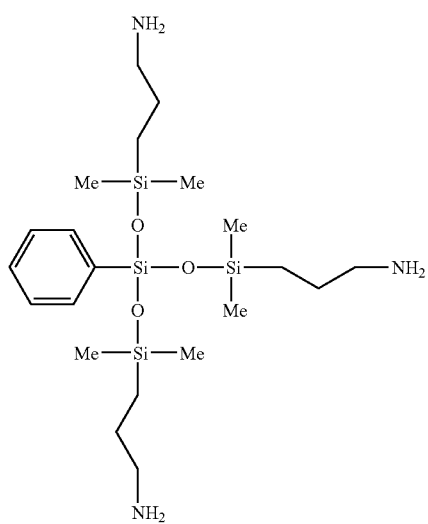

A solution of PhSi(OSiMe$_2$H)$_3$ (10 g, 30 mmol) in 40 ml dry toluene and 0.5 ml of Karsted's catalyst (5% in xylenes), was treated with about 6.5 g (108 mmol) allylamine. The reaction mixture was heated to reflux for about 2 h. The reaction mixture was then concentrated under reduced pressure on a rotary evaporator to yield about 16.1 g of aminosiloxane Va as dark, viscous liquid. $^1$H NMR (CDCl$_2$, ppm δ): 7.62 m (2H, Ph); 7.4 m (3H, Ph); 2.62 tr (6H, CH$_2$NH$_2$, J$_{H-H}$=6.8 Hz); 1.45 m (6H, CH$_2$CH$_2$CH$_2$); 1.05 brs (6H, NH$_2$); 0.60 m (6H, CH$_2$Si); 0.16 s (18H, SiMe$_2$). Carbon dioxide uptake was determined at 40° C. as disclosed herein and found to be 7.3%.

Example 13

Preparation of Silyloxysilyl oxirane 1a

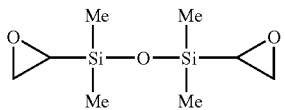

Divinyltetramethyldisiloxane (50.45 g, 0.27 mol) was dissolved in 200 mL of CHCl$_3$ in a 2 L flask equipped with a magnetic stir bar and an addition funnel. The contents were cooled to 0° C. m-Chloroperbenzoic acid (140 g, 10% excess) was combined with 1 L CHCl$_3$ then filtered, and the filtrate was charged to the addition funnel. The m-chloro-perbenzoic acid (mCPBA) solution was slowly added to the divinyltetramethyldisiloxane solution over the course of about 2 hours and the reaction mixture was stirred over night. The contents were extracted with 1.5 L of 5% Na$_2$CO$_3$ and the organic layer was dried with MgSO$_4$. The drying agent was removed by filtration and the filtrate was concentrated under reduced pressure on a rotary evaporator. Residual m-chlorobenzoic acid was removed by filtration after the addition of hexanes to the crude product and cooling in a freezer to afford silyloxysilyl oxirane 1a. $^1$H NMR (CDCl$_3$) δ: 2.89 (m, 2H), 2.59 (m, 2H), 2.20 (m2H), 0.16 (s, 18H). IR (neat oil, NaCl plates, cm$^{-1}$): 3040 (w-m), 2960 (m), 1724 (m), 1408 (w-m), 1319 (m), 1256 (s), 1231 (sh), 1057 (vs), 948 (m), 880 (s), 838 (s), 793 (vs).

Preparative Method A: Preparation of Trimethylsilyl oxirane 1b

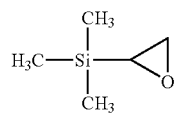

Vinyltrimethylsilane (25.26 g, 0.2523 mol) was charged to a 1 L flask in 50 mL CHCl$_3$ and cooled to 0° C. mCPBA (m-chloroperbenzoic acid) (67 g) was dissolved in 500 mL of CHCl$_3$ and charged to an addition funnel and added over the course of 1 h. The contents were stirred overnight. The mixture was extracted with 5% Na$_2$CO$_3$, dried with MgSO$_4$ then distilled at atmospheric pressure to give 23.5 g product as a colorless liquid, 80% yield, bp 105-108° C. $^1$H NMR (CDCl$_3$) δ: 2.89 (m, 1H), 2.54 (m, 1H), 2.18 (t, 1H), 0.05 (s, 9H). IR (neat oil, NaCl plates, cm$^-$): 3017 (m), 2059 (s), 1317 (m), 1250 (s), 949 (w-m), 882 (sh), 842 (vs), 755 (vs).

Preparative Method B: Preparation of silyloxysilyl oxirane 1c
(CAS No. 18395-62-5)

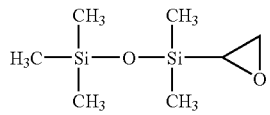

Vinyldimethylsiloxytrimethylsilane (25 grams, 1 equivalent) 25.26 g, 0.2523 mol) is charged to a 1 L flask in 50 mL CHCl$_3$ and cooled to 0° C. mCPBA (m-chloroperbenzoic acid) (1.1 equivalents) is dissolved in 500 mL of CHCl$_3$ and charged to an addition funnel and added over the course of 1 hour. The reaction mixture is stirred overnight and then extracted with 5% Na$_2$CO$_3$, dried with MgSO$_4$, filtered and the filtrate concentrated under reduced pressure to provide the product Silyloxysilyl oxirane 1c.

Example 14

Reaction of amino-siloxane VI with carbon dioxide

To tared, 25 mL, three-neck, round-bottom flask equipped with a mechanical stirrer, gas inlet and a gas outlet and heated with a temperature controlled oil bath, was charged 2.0707 g of 1,3-bis(3-aminopropyl)tetramethyldisiloxane VI. Dry CO$_2$ gas was introduced at a rate of ~50 mL/min into the flask via a glass tube positioned approximately 10 mm above the surface of the stirred liquid. Contacting with CO$_2$ was continued for 2 hours at 40° C. after which time the exterior of the flask was cleaned and the flask weighed. The total weight gain of 0.3588 g corresponded to 71% of the theoretical amount of weight that should have been gained if all the amine groups had reacted CO$_2$ (i.e. if the degree of reaction had been 100%). The reaction product was also a solid and constitutes the reaction product of amino-siloxane VI with carbon dioxide.

Example 15

Reaction of amino-siloxane VI with carbon dioxide 1,3-Bis(3-aminopropyl)tetramethyldisiloxane VI (2.0261 grams) and triethyleneglycol dimethyl ether (2.1198 grams) were charged to a flask equipped as in Example 14 and contacted with CO$_2$ according to the procedure described in Example 14. The total weight gain was 0.2984 g. This corresponded to 83% of the theoretical amount of weight that should have been gained if all the amine groups present in amino-siloxane VI had reacted with CO$_2$. The reaction product was a solid.

Example 16

Reaction of amino-siloxane VI with carbon dioxide 1,3-Bis(3-aminopropyl)tetramethyldisiloxane (2.0366 grams) and triethyleneglycol dimethyl ether (4.0306 grams) were charged to a flask equipped as in Example 14 and contacted with CO$_2$ according to the procedure described in Example 14. The total weight gain was 0.3566 g. This corresponded to 99% of the theoretical amount of weight that should have been gained if all the amine groups had reacted with CO$_2$. The reaction product was a solid.

Example 17

Reaction of amino-siloxane VI with carbon dioxide 1,3-Bis(3-aminopropyl)tetramethyldisiloxane (2.0194 grams) and triethyleneglycol (2.0174 grams) were charged to a flask equipped as in Example 14 and contacted with CO$_2$ according to the procedure described in Example 14. The total weight gain was 0.4089 g. This corresponded to 114% of the theoretical amount of weight that should have been gained if all the amine groups had reacted with a stoichiometric amount of CO$_2$. The theoretical reaction stoichiometry is two moles of amine group per mole of CO$_2$. The reaction product was a liquid.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An amino-siloxane composition comprising structure I

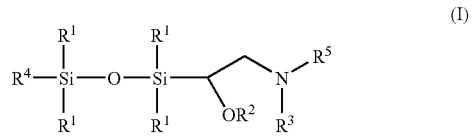

wherein $R^1$ is independently at each occurrence $C_1$-$C_5$ alkyl; $R^2$ is hydrogen or $C_1$-$C_3$ acyl; $R^3$ is a bond, hydrogen or $C_1$-$C_5$ alkyl; $R^4$ is $C_1$-$C_5$ alkyl or $R^5$; and $R^5$ is independently at each occurrence a $C_1$-$C_{30}$ aliphatic radical comprising at least one NH$_2$ group or secondary amine group.

2. The composition according to claim 1 having structure Ia

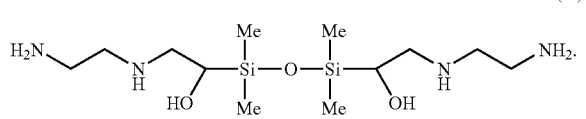

3. The composition according to claim 1 having structure Ib

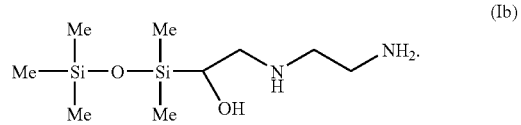

4. An amino-siloxane composition comprising structure II

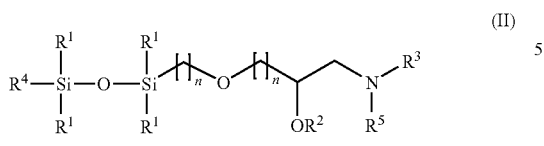

(II)

wherein $R^1$ is independently at each occurrence $C_1$-$C_5$ alkyl; $R^2$ is hydrogen or $C_1$-$C_3$ acyl; $R^3$ is a bond, hydrogen, or $C_1$-$C_5$ alkyl; $R^4$ is $C_1$-$C_5$ alkyl or $R^5$; $R^5$ is independently at each occurrence a $C_1$-$C_{30}$ aliphatic radical comprising at least one $NH_2$ group or secondary amine group; and n is independently at each occurrence 1-3.

5. The composition according to claim 4 having structure IIa

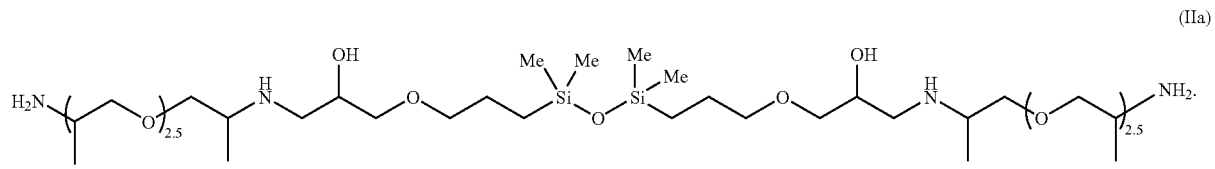

(IIa)

6. The composition according to claim 4 having structure IIb

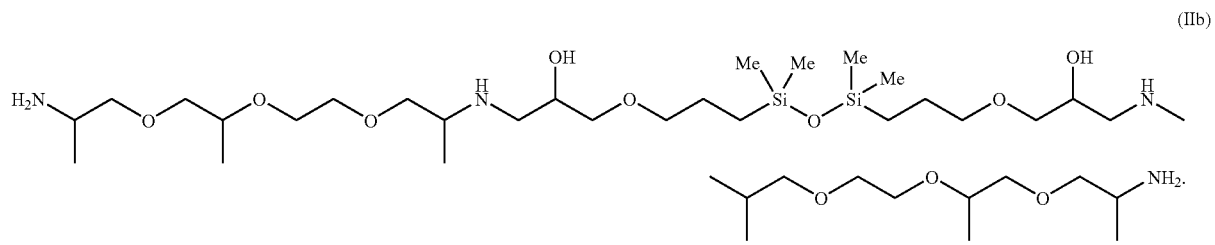

(IIb)

7. A method of preparing an amino-siloxane composition having structure 3; said method comprising contacting a siloxysilyl oxirane having structure 1 with an organic amine having structure 2

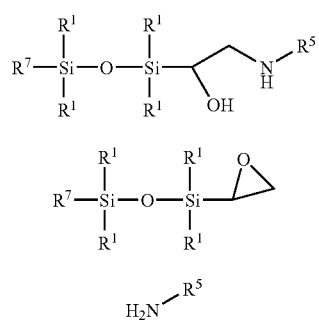

(3)

(1)

(2)

wherein $R^1$ is independently at each occurrence $C_1$-$C_5$ alkyl; and $R^5$ is a $C_1$-$C_{30}$ aliphatic radical comprising at least one $NH_2$ group or secondary amine group, and $R^7$ is a $C_1$-$C_{30}$ aliphatic radical or a $C_2$-$C_{30}$ cycloaliphatic radical.

8. The method according to claim 7, wherein siloxysilyl oxirane has structure 1a

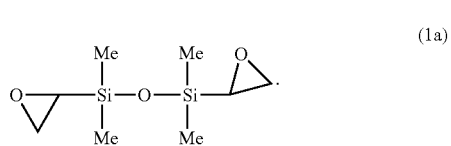

(1a)

9. A method of reducing the amount of carbon dioxide in a process stream comprising contacting the stream with a carbon dioxide absorbent comprising at least one amino-siloxane selected from the group consisting of amino-siloxanes having structure I, and amino-siloxanes having structure II

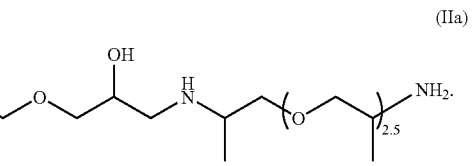

(I)

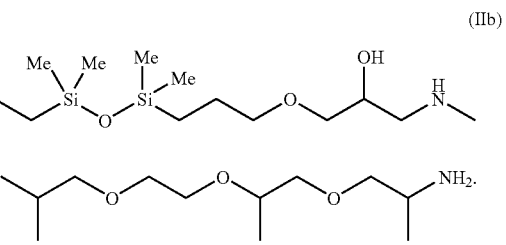

(II)

wherein $R^1$ is independently at each occurrence $C_1$-$C_5$ alkyl; $R^2$ is hydrogen or $C_1$-$C_3$ acyl; $R^3$ is independently at each occurrence a bond, hydrogen or $C_1$-$C_5$ alkyl; $R^4$ is $C_1$-$C_5$ alkyl or $R^5$; $R^5$ is independently at each occurrence a $C_1$-$C_{30}$ aliphatic radical comprising at least one $NH_2$ group or secondary amine group; $R^5$ is independently at each occurrence a $C_1$-$C_{30}$ aliphatic radical comprising at least one $NH_2$ group or a secondary amine group; and n is independently at each occurrence 1-3.

10. The method according to claim 9, wherein the amino-siloxane is a liquid.

11. The method according to claim 9, wherein said process stream is a by-product from coal combustion.

* * * * *